March 6, 1962   F. A. GUERTH   3,024,449
ELECTRO-OPTICAL INDICATING SYSTEM
Filed Dec. 23, 1959   2 Sheets-Sheet 1

INVENTOR.
FRITZ A. GUERTH

March 6, 1962 — F. A. GUERTH — 3,024,449
ELECTRO-OPTICAL INDICATING SYSTEM
Filed Dec. 23, 1959 — 2 Sheets-Sheet 2

INVENTOR.
FRITZ A. GUERTH
BY
George J. Rubens
ATTORNEYS

United States Patent Office 3,024,449
Patented Mar. 6, 1962

3,024,449
ELECTRO-OPTICAL INDICATING SYSTEM
Fritz A. Guerth, Camarillo, Calif., assignor to the United States of America as represented by the Secretary of the Navy
Filed Dec. 23, 1959, Ser. No. 861,727
9 Claims. (Cl. 340—177)
(Granted under Title 35, U.S. Code (1952), sec. 266)

The invention described herein may be manufactured and used by or for the Government of the United States of America for governmental purposes without the payment of any royalties thereon or therefor.

The present invention relates to indicators, and more particularly to an electro-optical system for converting one form of scalar indication into another form which is more readily understandable to an observer.

There are numerous occasions where intelligence is transmitted as an electrical variation and reproduced by a meter having a pointer which possesses only a limited degree of angular rotation. Thus is true, for example, in the case of information telemetered from a guided missile to a ground location or to a launching aircraft, such information usually pertaining to some characteristic of the flight path that the missile is following. Frequently the received data is applied to a meter to permit visual observation thereof, and the meter scale in many cases is calibrated over a range which does not exceed 90°. The two extremities of such a scale may respectively represent two opposite points of the compass, while the midpoint, 45° removed from either scalar extremity, is indicative of each of the two remaining principal compass points. As an example, the ends of the meter scale may respectively designate "East" and "West," while the scalar midpoint may correspond both to "North" and "South." The possibility of confusion to an observer when such directional ambiguity exists is readily apparent, since unless the previous movement of the meter needle has been followed, there is no way to ascertain whether the needle in its intermediate position is indicative of a "North" or a "South" direction of movement of the object being monitored. Furthermore, when the course of the monitored object changes to pass through the compass point represented by an extremity of the meter scale, the meter needle immediately moves completely across the dial to a point near the opposite scalar extremity. Even more importantly, an object which wavers slightly from one side to the other of such a course causes the meter needle to oscillate rapidly from one end of the scale to the other, rendering a correct reading almost impossible of attainment even by a skilled observer. It would be highly desirable to have a full 360° scale available, but this has hitherto not been possible when utilizing available equipment.

In accordance with a preferred embodiment of the present invention, the limited range of the scale previously used for indicating data such as above set forth is expanded to a full 360° by means of an optical system which utilizes a pair of light beams respectively focused onto a double-sided mirror. The latter is carried by the meter output shaft and rotates therewith, the two light beams being respectively reflected from the two sides of the mirror onto a translucent scale of annular configuration. However, the direction of movement of one of these light beams is inverted following reflection from the mirror, so that the two beams produce spots which in effect rotate around the scale in opposite directions. In order to clearly represent the received data, only one of the sources respectively producing the two light beams is energized at any one instant of time, with each beam generating a spot which travels over a particular 180° segment of the translucent scale. Thus, no ambiguity can exist, and the precise direction of movement of the object under inspection is at all times readily apparent to an observer.

One object of the present invention, therefore, is to provide an improved form of electro-optical indicating system.

A further object of the invention is to provide an electro-optical indicating system for converting a limited arcuate scale into an annular scale which extends over a full range of 360°.

An additional purpose of the invention is to provide an indicating system which is useful in yielding visual directional information respecting a remote object from which data is transmitted, such visual information containing no ambiguity as to the object's actual direction of movement.

Other objects and many of the attendant advantages of this invention will be readily appreciated as the same becomes better understood by reference to the following detailed description when considered in connection with the accompanying drawings wherein.

The complete system of applicant's invention comprises (1) a data-collecting and indicator-control-voltage generator, and (2) an electro-optical arrangement for yielding a visual indication of the collected data, the electro-optical arrangement being under the control of the generated indicator voltage. Preferably, these two units respectively constitute a transmitter and a receiver, although, as will be subsequently brought out, it is not necessary that actual space transmission and reception occur between the point of data generation and the point where reproduction of such data is effected. In cases where the reproducing apparatus is in the general vicinity of the data-collecting device, a direct electrical connection therebetween may be employed if such an expedient is deemed preferable.

Figure 1:
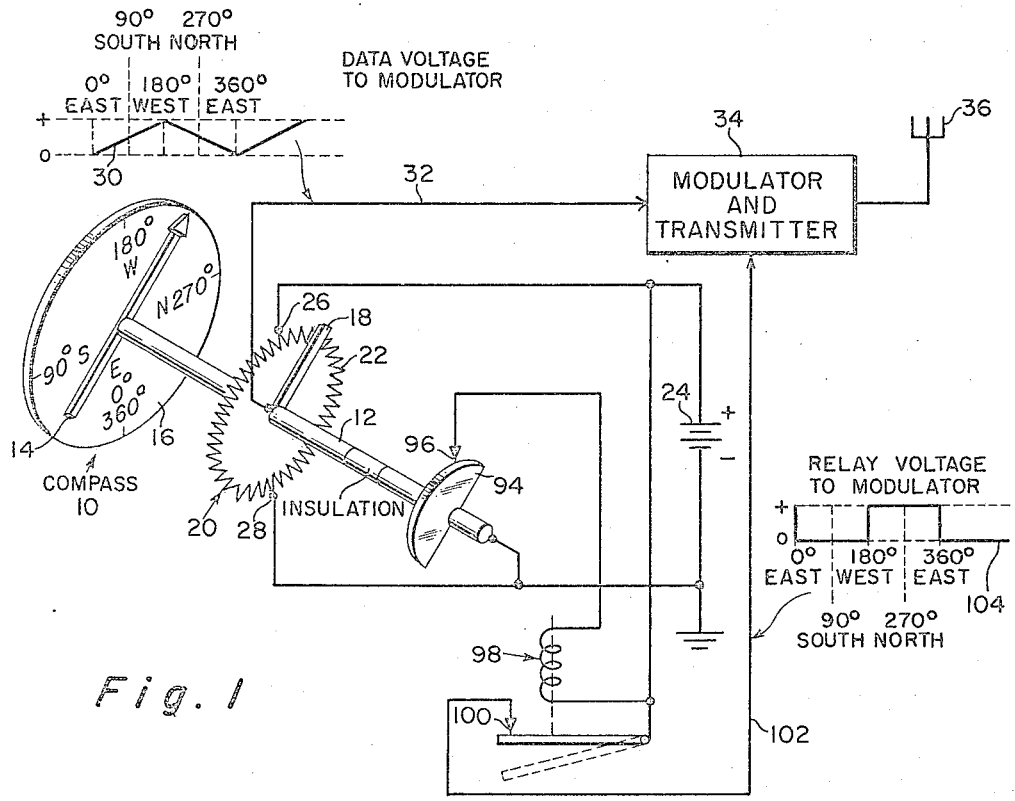
FIG. 1 is a schematic diagram of one form of data collecting and transmitting system designed in accordance with the principles of the present invention.

Referring now to FIG. 1 of the drawings, there is shown a data-collecting and transmitting system which includes a compass generally designated by the reference numeral 10. The compass 10 may, for example, form part of the guidance apparatus of a missile or rocket from which it is desired to collect information respecting the latter's flight course or trajectory, such information being then telemetered to a monitor aircraft or to a ground location so that it may be visually reproduced directly or recorded for subsequent analysis. The compass 10 includes an output shaft 12 which carries an indicator needle 14 associated with a dial 16, although the latter two elements are obviously unnecessary when the craft carrying the compass is unmanned.

It will be assumed that the instantaneous angular position of the compass shaft 12 (with respect to an arbitrary zero degree or reference point of needle 14, such, for example, as "East") constitutes the information desired for recording or observation. To obtain this data, the shaft 12 (or an extension thereof) has secured thereto the wiper arm 18 of a ring potentiometer 20. Wiper arm 18 lies in parallel relation to the compass indicator needle 14, or, on an unmanned aircraft where no needle is utilized, the angular position of arm 18 is indicative of the departure, if any, of shaft 12 from the arbitrarily chosen reference position.

The ring potentiometer 20 also includes an annular resistance element 22 which is slidably contacted by the wiper arm 18. Resistance element 22 is energized from a battery or other source of D.-C. potential 24, connections being made from the latter to two points 26 and 28 on the resistance element 22. These two points 26 and 28 are spaced 180° apart, with the former corresponding, for example, to a "West" position of compass needle 14 and the latter corresponding to an "East" position of the needle. As a result, the wiper arm 18 is at a point of maximum D.-C. potential when in West position, and at a point of zero or ground potential when in East position. During a 360° rotation of wiper arm 18, a data voltage having the waveform 30 is generated in output conductor 32, this voltage having a minimum value at compass points 0° and 360° (East) and a maximum value at 180° (West). Compass points of 90° (South) and 270° (North) are at the same potential level intermediate such maximum and minimum excursions of wave 30. The output energy thus developed is applied to modulate the carrier wave of a transmitter 34 in conventional fashion, the modulated carrier wave then being radiated from antenna 36.

Figure 2:
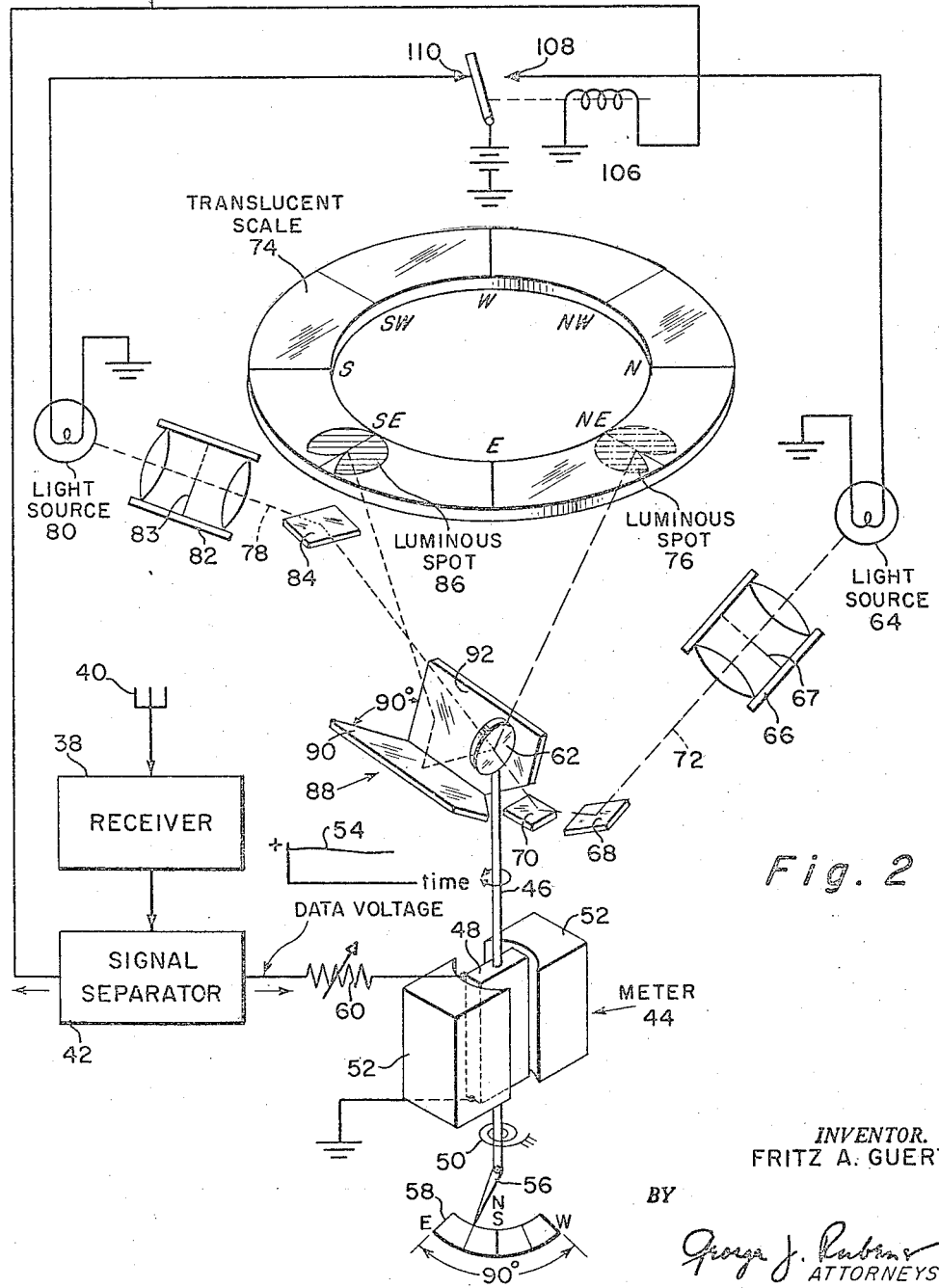
FIG. 2 is a schematic diagram of one form of reproducing apparatus designed to receive data transmitted by the system of FIG. 1.

Referring now to FIG. 2, there is shown one form of receiving apparatus designed to reproduce data transmitted by the system of FIG. 1. The arrangement of FIG. 2 includes a more or less conventional receiver 38 which acts to demodulate the signal picked up by antenna 40. This demodulated signal, which contains the data information present in wave 30 of FIG. 1, is applied through a signal separator 42 (the purpose of which will be set forth hereinafter) to a voltmeter which is generally identified in the drawing by the reference numeral 44. Since meter 44 is of standard design, it will not be described in detail, and it will suffice to state that it includes an output shaft 46 upon which a coil 48 is mounted for rotation therewith, the shaft 46 being biased to zero position by a spring 50. Permanent magnets 52 perform their customary function of developing an electromagnetic field within which the coil 48 rotates when the data voltage (represented in FIG. 2 by waveform 54) is applied thereto.

In many indicators hitherto employed, the meter shaft 46 has affixed thereto a pointer 56 associated with a calibrated scale 58. Although the latter two elements are not utilized in applicant's system as described herein, they are illustrated in the drawing to facilitate an understanding of the inventive concept.

The scale 58 in prior art devices is ordinarily limited to a range of 90°, as indicated in FIG. 2, giving rise to the North-South ambiguity mentioned in the preceding discussion. The adjustment of resistor 60 is such that the data voltage (shown as a function of angular rotation of shaft 12 in FIG. 1 and as a function of time in FIG. 2) swings the pointer 56 from East position at zero voltage to West position at maximum potential against the tension of spring 50. Consequently, when the data voltage wave 30 (which represents a 360° rotation of compass needle 14) extends through its full range, the pointer 56 of meter 44 will move through an arc of 90° from East to West and then return over this same path to its original starting point.

To convert this 90° angular rotation of meter shaft 46 into a 360° scale reading similar to that provided by the compass 10 of FIG. 1, the meter shaft 46 has mounted thereon a double-sided mirror 62 which rotates with the shaft 46 and is arranged so that the shaft axis lies essentially in the plane of the mirror, assuming the latter to be of minimum thickness. A beam of light from a source 64 is focused onto one side of mirror 62 through a lens system 66 which incorporates an indicia-producing mask 67, the light beam after passage through this lens system being then sequentially reflected from a pair of stationary planar mirrors 68 and 70, each of which serves to change the direction of the light beam in the manner illustrated. Following impingement on mirror 62, the light beam (designated by the single median ray 72) is reflected upwardly (in the drawing) to strike the under surface of a translucent scale 74.

The translucent scale 74 is of annular configuration and is calibrated much in the manner of dial 16 of compass 10 in FIG. 1—that is, it includes scalar designations corresponding to the North, South, East and West compass positions. Assuming that the scale 74 lies in a horizontal plane, and that the axis of meter shaft 46 is vertical, or normal to the horizontal plane of scale 74 at its center, then a 90° rotation of mirror 62 (corresponding to a 90° movement of pointer 56 over scale 58 from East to West) will cause the light beam 72 reflected from mirror 62 to describe an arc of 180° on scale 74. The luminous spot 76 produced by impingement of light beam 72 on scale 74 (which includes the indicia developed by mask 67) will travel around the scale through an angle of 180° from East through North to West when shaft 46 rotates through its maximum angle of 90°. Due to the translucent nature of the material of which scale 74 is composed, the luminous spot 76 will be visible to an observer viewing the upper (in the drawing) surface of the scale.

A second light beam 78 from a further source 80 is focused by a second lens system 82 (incorporating a further indicia-producing mask 83) onto the reverse surface of the double-sided mirror 62 from that onto which the beam 72 is focused by lens system 66. Prior to impingement on mirror 62, the beam 78 is once reflected from a stationary planar mirror 84, as illustrated, this action serving to align the axis of beam 78, as reflected from mirror 84, with the axis of beam 72 as reflected from mirror 70. Expressed differently, these two beams 72 and 78 have equal angles of incidence in the plane of the mirror 62, the former beam being directed upwardly to strike one surface of mirror 62 at a given angle and the latter beam being directed downwardly to strike the other mirror surface at an identical angle.

For a complete 360° coverage of the scale 74, it is necessary that each of the light beams 72—78 traverse a respective full 180° segment thereof following reflection from the rotatable double-sided mirror 62. Furthermore, it is required that the information presented to an observer be free from ambiguity and continuous in the sense that an uninterrupted 360° rotation of compass shaft 12 will yield a corresponding uninterrupted 360° movement of a luminous spot on scale 74. The spot 76 produced by light beam 72 travels in a counter-clockwise direction around scale 74 from East through North to West when the pointer 56 covers an arc of 90° from East to West. Returning from West to East, the pointer 76 passes through South, and hence a light spot on scale 74 should continue in a counter-clockwise direction over an arc of 180° from West through South to East, reaching the latter compass position concurrently with pointer 56 at the instant the data voltage 54 becomes zero.

In order that the disclosed system may operate in the above manner, it is necessary that the luminous spot 86 produced on scale 74 by impingement of beam 78 (which includes the indicia developed by mask 83) move in a direction opposite to that of spot 76 produced by impingement of beam 72. When the latter spot in effect rotates in a counter-clockwise direction, the spot 86 must rotate in clockwise fashion. With both spots visible to an observer, they would, for example, coincide at West compass position (representing maximum voltage of wave 30, FIG. 1) then diverge to become oppositely-disposed at North and South positions, respectively, and finally converge to again coincide at East compass position, or zero data voltage.

To bring about the above-described movement of the light spots 76 and 86 around the annular scale 74, the direction of movement of the light beam 78 is inverted following its reflection from the double-sided mirror 62 and prior to its impingement on the translucent scale 74.

Figure 3:
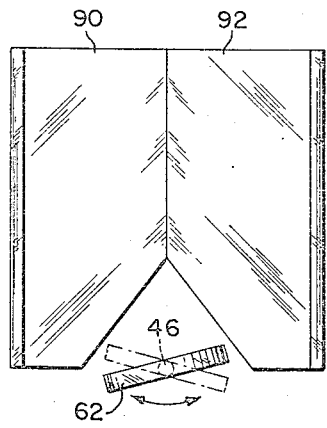
FIGS. 3 and 4 are detailed views of one of the optical components of the reproducing system illustrated in FIG. 2.
Figure 4:
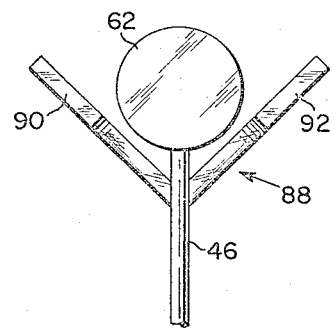

This is achieved by means of a so-called "corner mirror" 88 made up of two planar mirrors 90 and 92 disposed at right angles to one another. As also shown in FIGS. 3 and 4, the planar mirrors 90 and 92 are so disposed that the line of intersection therebetween lies at right angles to the axis of the meter shaft 46, and further so that they intercept the light beam 78 reflected from the double-sided mirror 62 as shaft 46 rotates. It is well known that mirror arrangements of this type have the property of inverting the direction of an emergent light beam with respect to that of an incident beam, so that sequential reflection of the beam 78 arriving from mirror 62, first from surface 90 and then from surface 92, will convert a counter-clockwise movement of the light rays leaving the surface of mirror 62 as the latter rotates in a counter-clockwise direction (from East to West) into a clockwise movement thereof, so that the developed luminous spot 86 will in effect move from East through South to West on scale 74.

Since obviously only one of the two luminous spots 76 and 86 should be visible at any one instant of time, means are provided by the present invention for de-energizing that particular one of the light sources 64—80 which would otherwise produce a spot yielding erroneous information. This de-energizing means includes a switch (FIG. 1) having a rotary arcuate contact 94 mounted on shaft 12 and a fixed contact 96. These two contacts are in electrical engagement during 180° of rotation of compass shaft 12, and out of electrical engagement during the remaining 180° of shaft rotation. The alignment of the contacts 94—96 is such that no electrical engagement exists therebetween for all positions of the compass needle 14 between zero and 180° (East through South to West) but that electrical engagement is established between the two contacts for all positions of compass needle 14 between 180° and 360° (West through North to East).

Switch contacts 94—96 are connected in a circuit which includes battery 24 and a relay 98. Where switch contacts 94—96 are closed, the relay coil is energized and contacts 100 are open. No energy is therefore present in output conductor 102 (see waveform 104). However, when switch contacts 94—96 are open, the coil of relay 98 is de-energized, and contacts 100 close to send the potential of battery 24 to conductor 102. This condition is also represented in waveform 104. The relay voltage 104 thus developed is employed to modulate the transmitter 34 in some preferred manner, as by multiplexing, which maintains an independence between the relay signals and the data information represented by wave 30.

At the receiver of FIG. 2, the relay voltage 104 is separated out by the unit 42 following demodulation of the combined signal. The separating means 42 may comprise, for example, a filter network of known design. The "on-off" relay voltage 104 is fed to the coil of a further relay 106 having a pair of contacts 108—110 respectively connected in the power supply circuits of the two light sources 64 and 80. The relay 106 operates so that only light source 80 is energized when the compass needle 14 lies between zero and 180°, and only light source 64 is energized when the compass needle 14 lies between 180° and 360°.

It is not necesary that the voltage generating and utilizing devices be in locations so remote from one another that actual space transmission and reception of the developed data takes place. Occasions may arise when the generating equipment is physically in the neighborhood of the observer, but so inaccessible as to be incapable of direct viewing. In such cases, direct electrical connections between the two units will suffice, the elements 34, 36, 38, 40 (and perhaps 42) being omitted.

Obviously many modifications and variations of the present invention are possible in the light of the above teachings. It is therefore to be understood that within the scope of the appended claims the invention may be practiced otherwise than as specifically described.

I claim:
1. An electro-optical indicating system for converting a limited arcuate scale into an annular scale which extends over a full range of 360°, said system including: means for generating a data voltage which rises over a portion of its range and declines over the remaining portion thereof; an electro-responsive device including a shaft having a limited degree of rotational movement corresponding to the rising portion only of said data voltage; means for applying the generated data voltage to said electro-responsive device; a double-sided planar mirror mounted on the shaft of said electro-responsive device and designed to rotate with said shaft, the two plane surfaces of said mirror lying parallel both to one another and to the axis of said shaft; a stationary annular scale lying in a plane essentially perpendicular to the axis of said shaft and concentric therewith; means for developing a pair of light beams; means for directing one of said light beams to one side of said mirror from which it is reflected to a point on said annular scale; means for directing the other of said light beams to the other side of said mirror; and means for inverting the direction of said other light beam following reflection thereof from said mirror, said inverted light beam then impinging a point on said annular scale, whereby, upon movement of said mirror in response to a movement of said electro-responsive device when said data voltage is applied thereto, the respective points of impingement of the two said light beams on said annular scale will describe paths which are generally arcuate in configuration, one of said points having a clockwise direction of movement and the other of said points having a direction of movement which is counter-clockwise.

2. An electro-optical indicating system in accordance with claim 1 in which said annular scale is composed of translucent material.

3. An electro-optical indicating system according to claim 1 in which said electro-responsive device comprises a voltmeter adapted to receive said data voltage.

4. An electro-optical indicating system in accordance with claim 1, in which the means for inverting the direction of said other light beam following reflection thereof from said double-sided mirror comprises a pair of planar reflectors disposed at an angle of 90° to one another, and from which said other light beam is sequentially reflected prior to impingement thereof on said annular scale, such sequential reflection of said other light beam resulting in the direction of the beam emerging from said double-sided mirror being opposite to the direction of the beam incident thereon.

5. An electro-optical indicating system in accordance with claim 1, further including switching means operating as a function of the operation of said data voltage generating means for rendering one only of said two light beams effective over the rising portion of the data voltage range, and the other one only of the light beams effective over the declining portion of the data voltage range.

6. An electro-optical indicating system in accordance with claim 5, in which the switching means for rendering the two light beams effective during selected portions of the data voltage range includes means for generating a beam-control potential having a first constant predetermined value over the rising portion of the data voltage range, and a second constant predetermined value over the declining portion of the data voltage range.

7. In an electro-optical indicating system: a remotely-located rotatable member the angular position of which it is desired to ascertain; a 360° ring potentiometer having a wiper element secured to said rotatable member; a source of D.-C. potential; connections for applying a D.-C. potential from said source to two oppositely-disposed points on said ring potentiometer, so that, as said member rotates, corresponding rotation of said wiper element will generate a data voltage which rises in amplitude over an arc of 180° and falls in amplitude over the remaining arc of 180°; an electro-responsive device having a rotatable output shaft; means for applying said data voltage to said electro-responsive device to rotate the output shaft thereof through an arc less than that through which said remotely-located member rotates; a double-sided mirror mounted on the output shaft of said electro-responsive device and designed to rotate therewith; an annular scale fixed in position and lying in a plane normal to the axis of the output shaft of said electro-responsive device and concentric therewith; means for generating a pair of light beams lying generally on opposite sides of the output shaft of said electro-responsive device; optical means, including at least one reflector, for directing one of said light beams to one surface of the double-sided mirror mounted on the output shaft of said electro-responsive device from which surface it is directed to said annular scale to develop a luminous spot thereon; further optical means for directing the other of said light beams to the remaining surface of said double-sided mirror; and means for inverting the direction of the said other light beam following reflection thereof from said double-sided mirror, said inverted light beam being directed by the said last-mentioned means to said annular scale to develop a further luminous spot thereon, whereby upon application of a varying data voltage to said electro-responsive device, said double-sided mirror will rotate to cause the two luminous spots respectively developed on said annular scale by the said two light beams to describe paths which are generally arcuate in configuration, one of said luminous spots having a clockwise direction of movement and the other of said luminous spots having a direction of movement which is counter-clockwise.

8. The combination of claim 7, further including a relay-control switch incorporating a contact carried by the rotatable member the angular position of which it is desired to ascertain, said relay-control switch having "on" status during 180° of rotation of said member and "off" status during the remaining 180° of such rotation, a source of potential in series with said relay-control switch, a relay forming part of said light beam generating means, and means for applying the "off-on" potential developed by said switch to said relay to control the development of one only of said pair of light beams at any particular instant of time depending upon the rotational status of the member the angular position of which it is desired to ascertain.

9. The combination of claim 8, in which said means for inverting the direction of said other light beam includes a corner mirror which acts to sequentially reflect said other light beam so that following such sequential reflection from said corner mirror the direction of the emergent beam is inverted with respect to its direction of incidence thereon.

References Cited in the file of this patent

UNITED STATES PATENTS

| | | |
|---|---|---|
| 2,836,064 | York | May 27, 1958 |
| 2,854,628 | Gude | Sept. 30, 1958 |